United States Patent [19]
Nobuhara

[11] Patent Number: 6,115,163
[45] Date of Patent: Sep. 5, 2000

[54] APPARATUS AND METHOD FOR RECEPTION OF OPTICAL BURST

[75] Inventor: Hiroyuki Nobuhara, Kawasaki, Japan

[73] Assignee: Fujitsu Limited, Kawasaki, Japan

[21] Appl. No.: 09/044,971

[22] Filed: Mar. 20, 1998

[30] Foreign Application Priority Data

Oct. 7, 1997 [JP] Japan ..................................... 9-274711

[51] Int. Cl.[7] .............................. H04B 1/06; H04B 10/06
[52] U.S. Cl. ............................................. 359/189; 359/125
[58] Field of Search .............................. 359/189; 375/318

[56] References Cited

FOREIGN PATENT DOCUMENTS 404358443  5/1991  Japan .

OTHER PUBLICATIONS

Su, C. et al "Theory of Burst–Mode Receiver and Its Applications in Optical Multiaccess Networks", Journal of Lightwave Technology, vol. 15, No. 4, Apr. 1997.

Eldering, C. A. "Theoretical Determination of Sensitivity Penelty of Burst Mode Fiber Optic Receivers", Journal of Lightwave Technology, vol. 11, No. 12, Dec. 1993.

Van der Plas, G., "APON: An ATM–based FITL system," paper presented at *EFOC & N '93*, the Eleventh Annual Conference, The Hague, Jun. 30–Jul. 2, 1993, pp. 91–95.

*Primary Examiner*—Jason Chan
*Assistant Examiner*—Agustine Bello
*Attorney, Agent, or Firm*—Staas & Halsey LLP

[57] ABSTRACT

An office-side optical burst receiving apparatus in for example an optical PON transmission system which solves the problem of reception failure due to a low frequency response, constituted by being provided with a pre-amplifier circuit for amplifying an output from a light receiving element, a main amplifier circuit for receiving the output signal thereof and a threshold value as differential inputs and discriminating logics "1" and "0", a threshold control circuit having a "1" level detection circuit and a "0" level detection circuit of the output signal, and a memory/calculation circuit for updating and storing the value regarding the level of the detected logic whenever a cell signal is received. It further contains an adder circuit which defines substantially a half value of a difference of levels of the logics "1" and "0" as a level value, adds the level of the logic "0" detected for the output signal now being received and the stored level, and applies the added value to the main amplifier circuit.

10 Claims, 16 Drawing Sheets

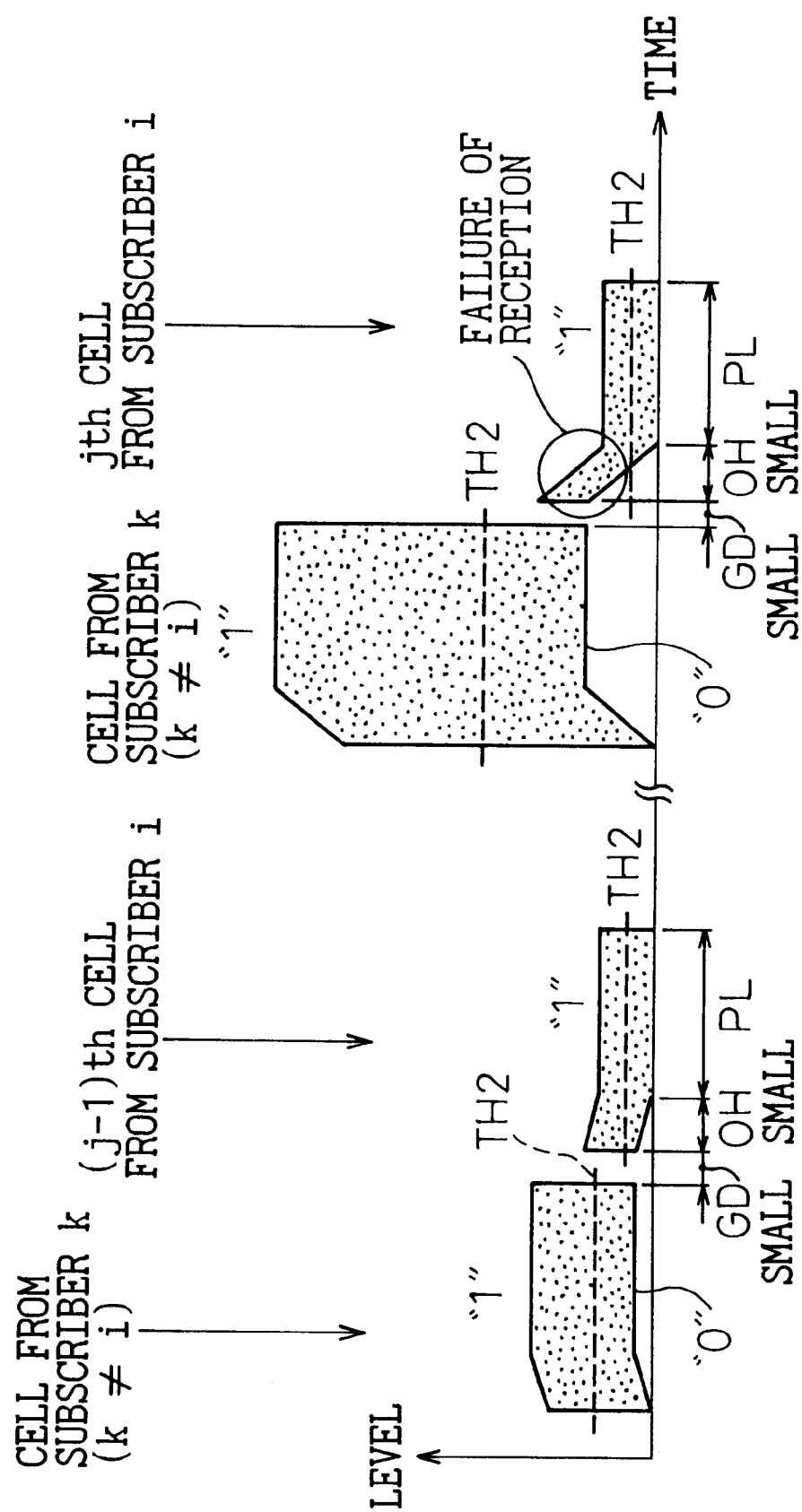

APPARATUS AND METHOD FOR RECEPTION OF OPTICAL BURST

BACKGROUND OF THE INVENTION

1. Field of the Invention

The present invention relates to an optical burst receiving apparatus.

Along with the development of multimedia technology, optical communication using optical fibers has been rapidly spreading. Particularly, while optical communication hitherto had mainly spread at the trunk line side, in the future optical communication will mainly spread at the subscriber side for realizing "fiber to the home" (FTTH) systems. The "subscriber side" referred to here includes not only individual subscribers (users), but also local area networks (LANS) etc. Note that the "subscriber side" spoken of in the present invention may further include even a system performing communication among two or more computers.

In for example a passive optical network (PON) transmission system, the subscriber side is constituted by an optical splitter (star coupler) connected to the office side equipment via a common optical fiber transmission line and a plurality of units of subscriber side equipment individually connected to this optical splitter via individual optical fiber transmission lines. Here, downstream optical transmission from the office side equipment to each subscriber side equipment is carried out by continuously transmitting cell signals, while upstream optical transmission from the plurality of units of subscriber side equipment to the office side equipment is carried out by using time slots allotted to the units of subscriber side equipment in advance and transmitting the cell signals of each subscriber in a burst-like manner in a time division mode in units of cells each having a fixed bit length.

Looking at the latter upstream optical transmission, the office side equipment receives the bursts of cell signals from the optical transmission apparatuses of the units of subscriber side equipment. The present invention relates to an optical burst receiving apparatus which receives the burst-like cell signals in the office side equipment. This optical burst receiving apparatus receives cell signals having different levels of received light for every time slot due to the difference of transmission loss of the individual optical fiber transmission lines. Therefore, the automatic threshold control (ATC) and automatic gain control (AGC) for this become important subjects.

2. Description of the Related Art

As an optical burst receiving apparatus in office side equipment used in for example the above PON transmission system, optical burst receiving circuits based on the following methods of control i) and ii) have already been disclosed:

i) The first is a high speed ATC/AGC method utilizing a high speed level-detecting circuit and ii) The second is a system ATC/AGC method utilizing sequence control information as one type of principal information in a PON transmission system.

As will be explained in detail later by referring to the drawings, in the system ATC/AGC method, both of a guard time (GD) and overhead region (OH) are small. Accordingly, the transmission efficiency of the entire PON transmission system is extremely good. This is a major advantage not obtained in the high speed ATC/AGC method.

However, there is also a disadvantage in this system ATC/AGC method. This is the occurrence of a portion of the signal wherein discrimination of the logic by the threshold value (TH2) becomes difficult due to the low frequency response. This causes the problem of failed reception. Further, even if reception does not fail, there is the problem of deterioration of the bit error rate (BER).

SUMMARY OF THE INVENTION

Accordingly, in consideration with the above problem, an object of the present invention is to provide an apparatus and method for reception of an optical burst making maintenance of high transmission efficiency possible without causing a failure of reception due to a low frequency response or a deterioration of the bit error rate.

To attain the above object, an optical burst receiving circuit according to the present invention is constituted as follows. Namely, it is provided with a pre-amplifier circuit for amplifying an output from a light receiving element, a main amplifier circuit for receiving the output signal thereof and a threshold value as differential inputs and discriminating logics "1" and "1", a threshold control circuit having a "1" level detection circuit and a "0" level detection circuit of the output signal, and a memory/calculation circuit for updating and storing the value regarding the level of the detected logic whenever a cell signal is received. It further contains an adder circuit which defines substantially a half value of a difference of levels of the logics "1" and "0" as a level value, adds the level of the logic "0" detected for the output signal now being received and the stored level, and applies the added value to the main amplifier circuit.

BRIEF DESCRIPTION OF THE DRAWINGS

The above object and features of the present invention will be more apparent from the following description of the preferred embodiments given with reference to the accompanying drawings, wherein:

FIG. 16 is a view of the threshold value used in an optical burst receiving apparatus operated by the system ATC/AGC method.

DESCRIPTION OF THE PREFERRED EMBODIMENTS

Before describing the embodiments of the present invention, the related art and the disadvantages therein will be described with reference to the related figures.

As already explained, as an optical burst receiving apparatus in the office side equipment used in for example the above PON transmission system, optical burst receiving circuits based on the following control methods i) and ii) have already been disclosed:

i) The first is a high speed ATC/AGC method utilizing a high speed level-detecting circuit and ii) The second is a system ATC/AGC method utilizing sequence control information (explained later) as one type of principal information in a PON transmission system.

Figure 10:
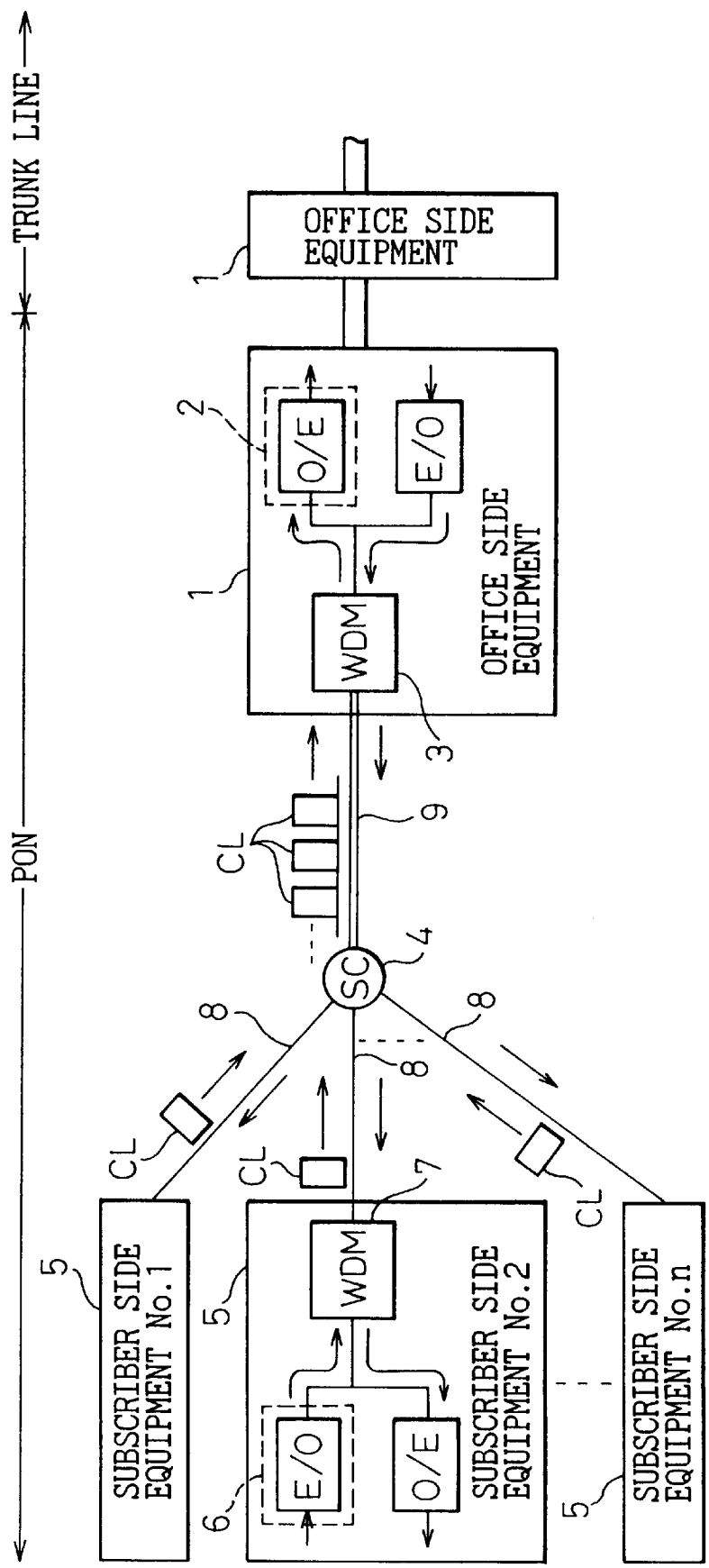
FIG. 10 is a view schematically showing an example of a transmission system to which the present invention is applied.

FIG. 10 is a view schematically showing an example of a transmission system to which the present invention is applied. In this case, it is a PON transmission system.

In the figure, reference numeral 1 denotes the office side equipment which constitutes the trunk line side in cooperation with the other office side equipment 1 shown at the right side in the figure. On the other hand, the apparatus 1 constitutes the subscriber side in cooperation with a plurality of units of subscriber side equipment (No. 1, No. 2, ..., No. n) 5 shown at the left side in the figure. The present invention is related to the PON transmission system.

In the PON transmission system, downstream optical transmission from the office side equipment 1 to the units of the subscriber side equipment 5 and upstream optical transmission from the units of the subscriber side equipment 5 to the office side equipment 1 reverse to the same are carried out. The present invention is related to the latter upstream optical transmission.

This upstream optical transmission is carried out by transmitting cell signals CL from the optical transmission apparatuses (indicated by electrical/optical converters "E/O" in the figure) 6 in the units of subscriber side equipment 5 and wavelength division multiplexers (WDM) 7 provided with a filtering function for preventing mutual interference with the downstream optical transmission. The cell signals CL pass through the individual optical fiber transmission lines 8, the optical splitter (star coupler SC) 4, and a common optical fiber transmission line 9 common to the plurality of units of the subscriber side equipment 5 and reach the office side equipment 1. The cell signals CL from the units of the subscriber side equipment 5 are transferred in bursts over this common optical fiber transmission line 9. Note that, in the downstream transmission from the office side equipment 1 to the units of the subscriber side equipment 5, continuous cell signal trains are sent over the transmission lines 9 and 8.

In upstream optical transmission, the burst-like cell signals CL reaching the office side equipment 1 are received at a receiving apparatus (indicated by an optical/electrical converter "O/E") 2 via a wavelength division multiplexer (WDM) 3 in the office side equipment 1. The logics "1" and "0" of the data contained in each cell signal CL are discriminated there. The present invention relates to this receiving apparatus 2—which will be referred to here as an "optical burst receiving apparatus". This is because it is an apparatus for receiving the optical cell signals in bursts.

Figure 11:
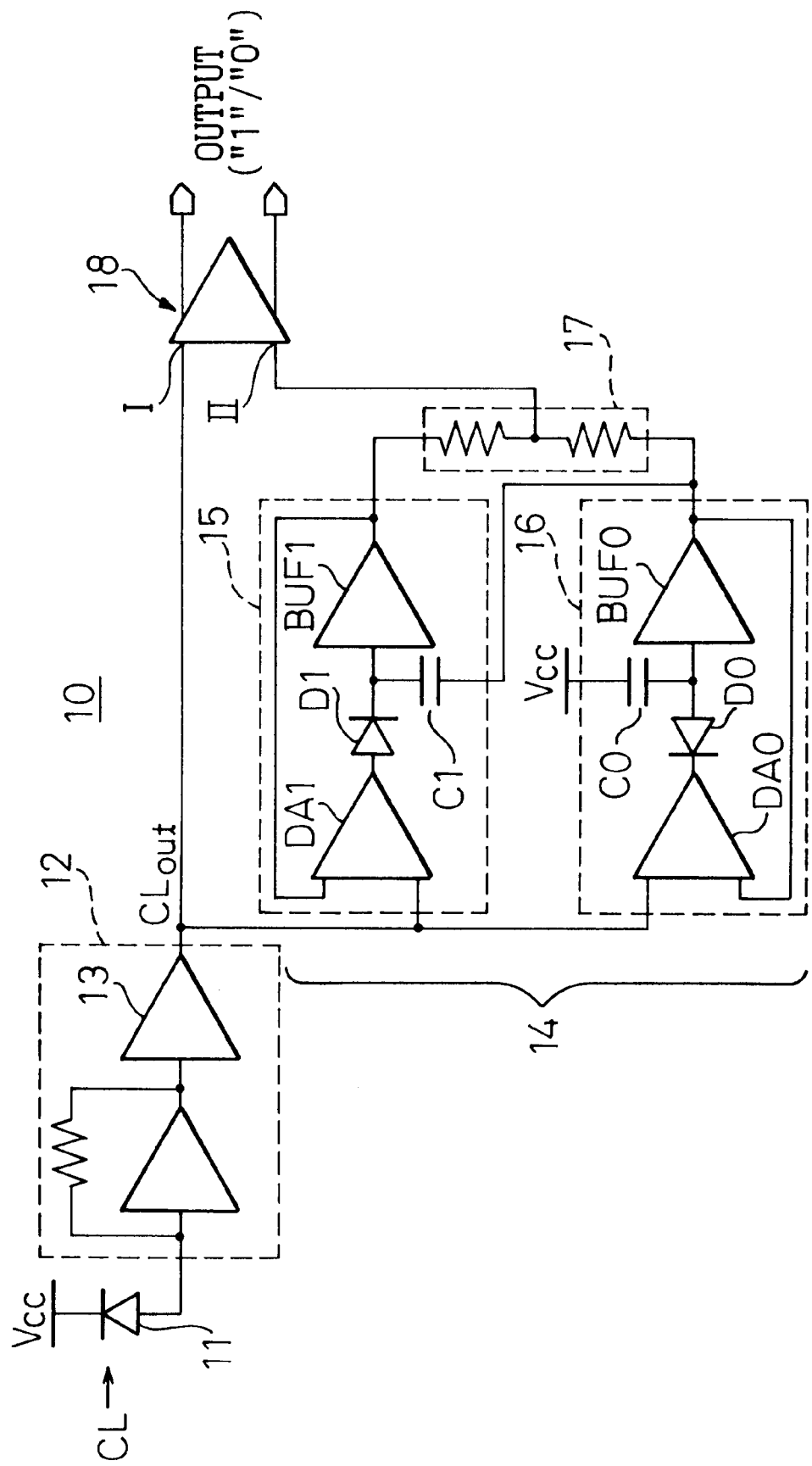
FIG. 11 is a view of a circuit configuration of an optical burst receiving apparatus operated by the high speed ATC/AGC method.

FIG. 11 is a view of the circuit configuration of an optical burst receiving apparatus operated by the high speed ATC/AGC method. The circuit configuration of an optical burst receiving apparatus operated by another method for comparison with this method, that is, the system ATC/AGC method, will be shown in FIG. 13 explained later. Note that an explanation of the AGC division in FIGS. 11 and 13 will be omitted.

Referring to FIG. 11, an optical burst receiving apparatus 10 operated by the high speed ATC/AGC method has a light receiving element 11 which first receives burst-like optical cell signals CL from the units of the subscriber side equipment 5 at its input stage and converts them to electrical signals.

The burst-like electrical cell signals from the light receiving element 11 are first transformed to low noise output signals at the pre-amplifier circuit 12, and then supplied to a first input I of the main amplifier circuit 18 on one hand via a buffer 13 and input to the threshold control circuit 14 on the other hand. The output from this threshold control circuit 14 is supplied to a second input II of the main amplifier circuit 18 as a threshold value. This threshold becomes a reference voltage when discriminating the logics "1" and "0" of the output signal (digital signal) CLout from the pre-amplifier circuit 12 applied to the first input I at the main amplifier circuit 18.

The threshold level used as this reference voltage is produced by the threshold control circuit 14. This is comprised of a "1" level detection circuit 15, a "0" level detection circuit 16, and a ½ voltage generating circuit 17. The "1" level detection circuit 15 detects the level of the logic "1" of the output signal CLout, while the "0" level detection circuit 16 detects the level of the logic "0" of the signal CLout. The center value of detected levels from the "1" and "0" level detection circuits 15 and 16, that is, an intermediate value of the "1" level and the "0" level, is given to the main amplifier circuit 18 as the threshold value from the ½ voltage generating circuit 17. Here, in the main amplifier circuit 18, a signal CLout exceeding the threshold value is discriminated as the logic "1", while a signal CLout not exceeding the threshold value is discriminated as the logic "0". These signals are further amplified and reformed to give complementary digital outputs ("1"/"0"). Note that these digital outputs are supplied for example to a later retiming circuit (not illustrated) for bit synchronization.

The "1" level detection circuit 15 and the "0" level detection circuit 16 basically have the same configuration. As illustrated, they comprise differential amplifiers (DA1, DA0), diodes (D1, D0), capacitors (C1, C0), and buffers (BUF1, BUF0). The diode D1 and diode D0 are connected to each other with opposite polarities and charge the capacitors C1 and C0 to the "1" level and the "0" level respectively. Here, one end of the capacitor C1 is connected to one end of the capacitor C0 via BUF0. The "1" level fluctuates following the fluctuation of the "0" level. This situation is clear from FIGS. 12A and 12B.

Figure 12A:
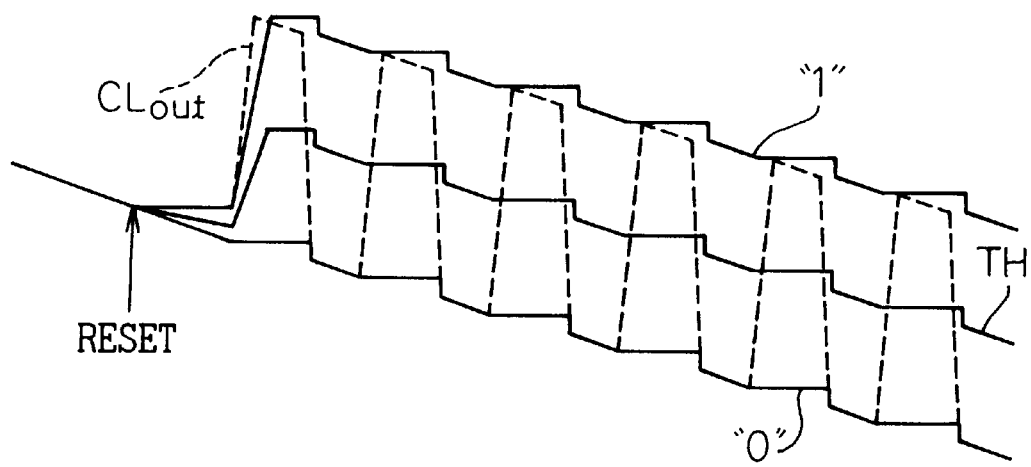
FIGS. 12A and 12B are views of waveforms of the principal parts in a receiving apparatus 10 of FIG. 11, particularly the waveform of the principal part in a threshold control circuit 14 and the output waveform from a main amplifier circuit 18.
Figure 12B:
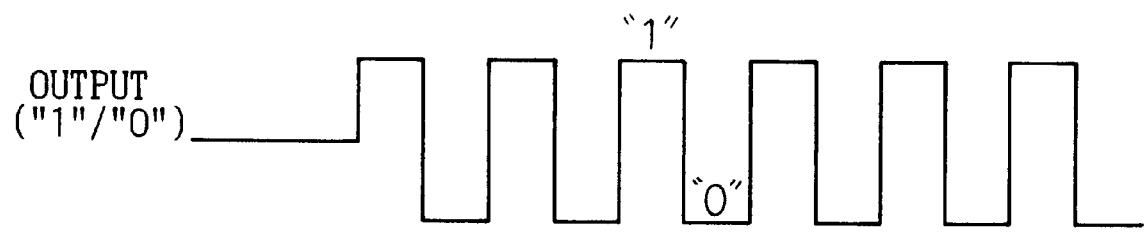

FIGS. 12A and 12B show waveforms of principal parts in the receiving apparatus 10 of FIG. 11, particularly the waveform of the principal parts in the threshold control circuit 14 and the output waveform from the main amplifier circuit 18.

In FIG. 12A, the waveform "0" is the output waveform of the "0" level detection circuit 16, while the waveform "1" shifting in level following this output waveform is the output waveform of the "1" level detection circuit 15. The output waveform of the ½ voltage generating circuit 17 for generating an intermediate value of the waveform "0" and the waveform "1" as a threshold value is indicated by "TH" in the figure.

The reason why that the waveform "0" and the waveform "1" gradually fall in FIG. 12A exists in the following nature, i.e., the header part of the output signal CLout (called the "preamble" and comprising an alternating bit train of "1" and "0") rises in level with respect to the main part of the output signal CLout (mentioned later). Further, the "RESET" in the figure shows that the capacitors C1 and C0 are reset by using a guard region between one cell signal and another cell signal.

Figure 13:
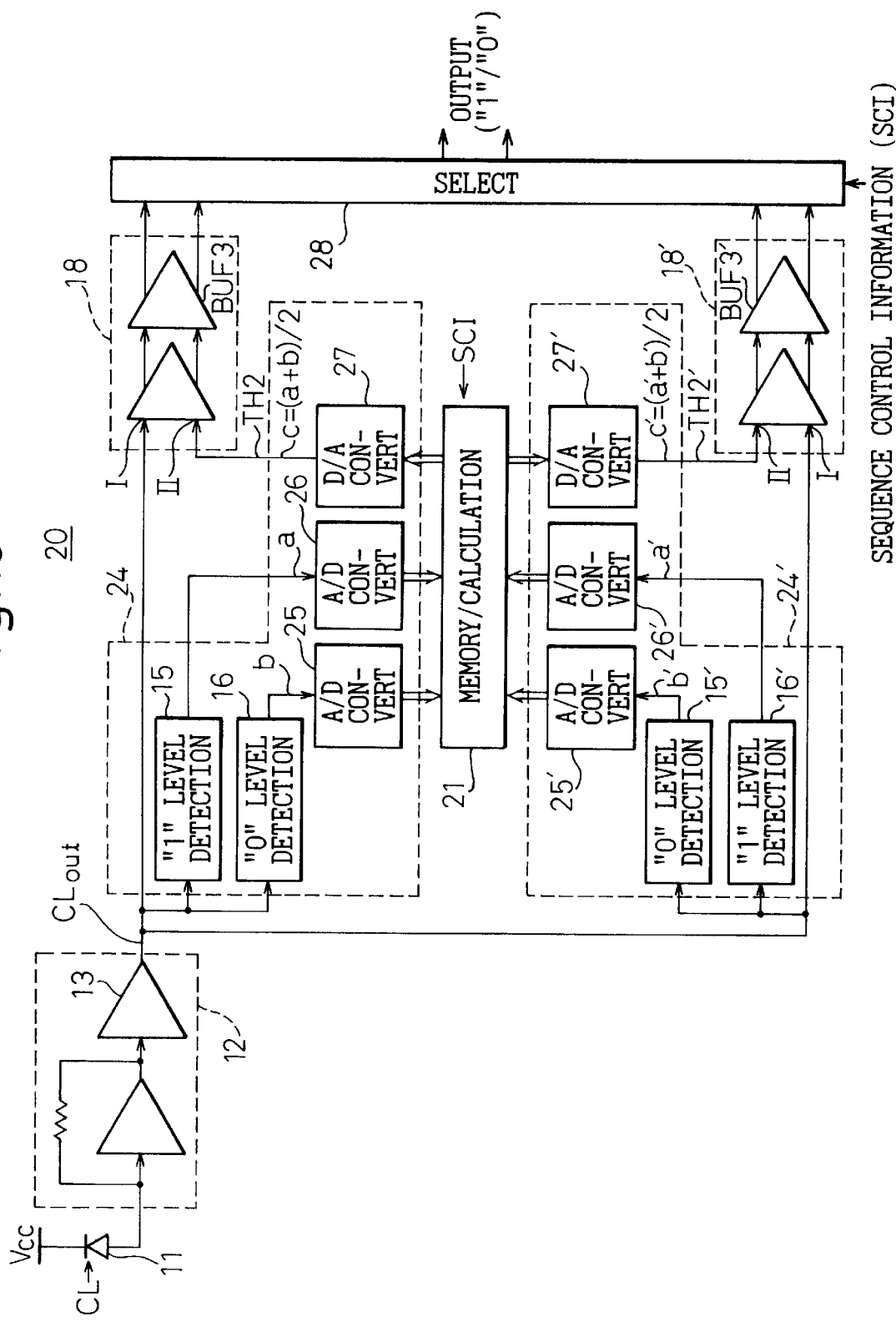
FIG. 13 is a view of the circuit configuration of an optical burst receiving apparatus operated by the system ATC/AGC method.

FIG. 13 is a view of the circuit configuration of an optical burst receiving apparatus operated by the system ATC/AGC method. Note that the same constituent elements are indicated by the same reference numerals or symbols throughout all of the figures. Accordingly, in the configuration forming the optical burst receiving apparatus 20 shown in the figure, the light receiving element 11, the Pre-amplifier circuit 12, the buffer 13, the "1" level detection circuit 15 (15'), the "0" level detection circuit 16 (16'), and the main amplifier circuit 18 (18') are as explained referring to FIG. 11.

The part of the circuit configuration which characterizes the optical burst receiving apparatus operated by the system ATC/AGC method shown in FIG. 13 is the memory/calculation circuit 21 and, further, the threshold control circuit 24 (24') further containing an A/D converter 25 (25'), an A/D converter 26 (26'), and a D/A converter 27 (27') necessary for cooperation with this memory/calculation circuit 21. Note that the reason why there are two divisions of threshold control circuits as indicated by the reference numerals 24 and 24' and the reason why there are two divisions of main amplifier circuits as indicated by the reference numerals 18 and 18' too are that by alternately switching for example the output signal CLout of odd numbered cells and the output signal CLout of even numbered cells at the first division (24, 18) and at the second division (24', 18') and selecting the output from one division by the selecting circuit 28, the operating speed required in each division can be halved. Accordingly, the configuration of the two divisions is not directly related to the principle of the system ATC/AGC method.

The principle of the system ATC/AGC method is best shown by the existence of the memory/calculation circuit 21. The memory/calculation circuit 21 has memory areas for every subscriber, defines the level of the logic "1" of the output signal CLout corresponding to (j−1)th (j=1, 2, 3, 4 . . . ) cell signals sent from the subscribers as a and the level of the logic "0" as b, and stores the a and b in the memory areas for every subscriber. The threshold value TH used for the discrimination of the logics "1" and "0" of the output signal CLout corresponding to the j-th cell signal at the main amplifier circuit 18 (18') is found for each subscriber by calculation from the values of the above a and b stored in the memory/calculation circuit for the output signal CLout corresponding to the immediately previous ((j−1)th) cell signal of each subscriber. A value C (=(a+b)/2) in the figure obtained by this calculation is used for the discrimination of the logics "1" and "0" of the currently received (j-th) output signal CLout. This value C corresponds to an intermediate value of the values a and b and corresponds to the level TH of FIG. 12A. In this way, as the threshold value used for the discrimination of the logics "1" and "0" of the current output signal CLout, the value C is found by calculation (C=(a+b)/2) from the level of the logic "1" and the level of the logic "0" which have been obtained in the immediately previous output signal CLout, therefore this system ATC/AGC method has the advantage that the operation may be performed at a low speed compared with the high speed ATC/AGC method.

The optical burst receiving apparatus according to the present invention is designed to overcome the later explained problems resulting from well known phenomenon of the "low frequency response" of a photodiode, therefore first an explanation will be made of this low frequency response.

Figures 14A, 14B:
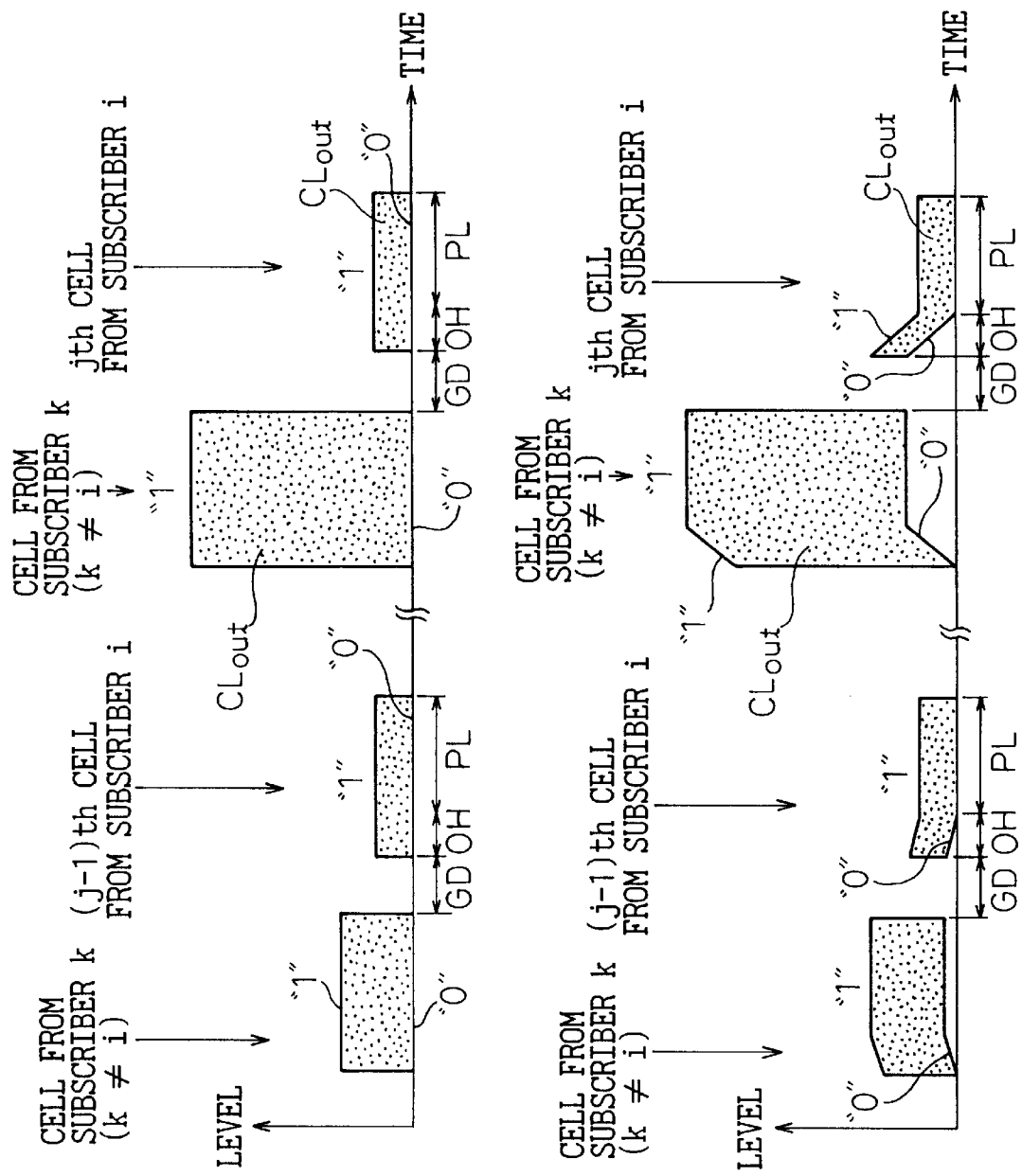
FIGS. 14A and 14B are views of waveforms of an output signal CLout of a case where there is no influence from a low frequency response and a case where there is an influence from a low frequency response.

FIG. 14A is a view of the waveforms of the output signal CLout of a case where there is no influence from a low frequency response, while FIG. 14B is a view of the waveforms of the output signal CLout of a case where there is an influence from a low frequency response.

In FIGS. 14A and 14B, the abscissa represents the time, and the ordinate represents the levels of the logics "1" and "0" of the output signal CLout.

In a PON transmission system, the office side equipment 1 has sequence control information. This sequence control information is information for controlling the sequence, that is, in what time slot and from which subscriber (i . . . k . . . ) a cell signal should be sent. Each subscriber has received this sequence control information in advance. That is, the timing of the transmission of the cell signal from each subscriber is assigned. In FIGS. 14A and 14B, an example is shown in which the optical burst receiving apparatus (2, 10, 20) in the office side equipment 1 receives burst-like cell signals from subscribers in a sequence such as a subscriber k (subscriber other than the subscriber i)→subscriber i→subscriber k→subscriber i→. . . . The level of the logic "1" is substantially the same for the same subscriber i, but the level of the logic "1" is different for different subscribers k (k=1, 2, 3 . . . ). The reason for this is that, as shown in FIG. 10, since the length etc. of the individual optical fiber transmission lines 8 for connecting the optical splitter (SC) 4 and each subscriber side equipment 5 are different, the transmission loss is different for each of the individual optical fiber transmission lines 8.

Further, OH in the figure denotes the overhead region in the bit format composing the input cell signal corresponding to each output signal CLout and contains the preamble. After this overhead region OH comes the payload region PL containing the inherent data information and destination information. Further, GD in the figure denotes the guard time. This is a space for preventing collision between adjacent cells.

Looking at FIG. 14A first, no abnormality is seen in the waveforms of the output signal CLout. This is because FIG. 14A shows a case where there is no influence from the low frequency response. Here, the "low frequency response" is a phenomenon inherent in the photodiode serving as the light receiving element 11. This phenomenon is caused due to the fact that electrons and holes generated by the light (cell signal) received at a region where an electric field generated inside the photodiode is small or a region where such an electric field has not been produced disappear with a long time constant (for example 1 to 100 $\mu$s).

When there is such an influence of a low frequency response, the series of output signals CLout shown in FIG. 14A appears with a distinctive waveform as shown in FIG. 14B. The "distinctive waveform" means that, first, the level of the logic "0" of the output signal CLout which appears in a burst as illustrated is gradually lifted and, second, in the subsequent output signal CLout which soon appears after a guard time GD immediately after the above output signal CLout, the rising portion thereof (OH) is pulled up, then the level gradually settles to the original level of "0" (dragging) (refer to FIG. 12B). Further, third, it means that a larger lifting tendency and dragging tendency appear in an output signal CLout having a larger logic "1" level. The present invention relates to a technique for processing the output signal CLout accompanied with the distinctive waveform shown in FIG. 14B due to the low frequency response.

Figure 15:
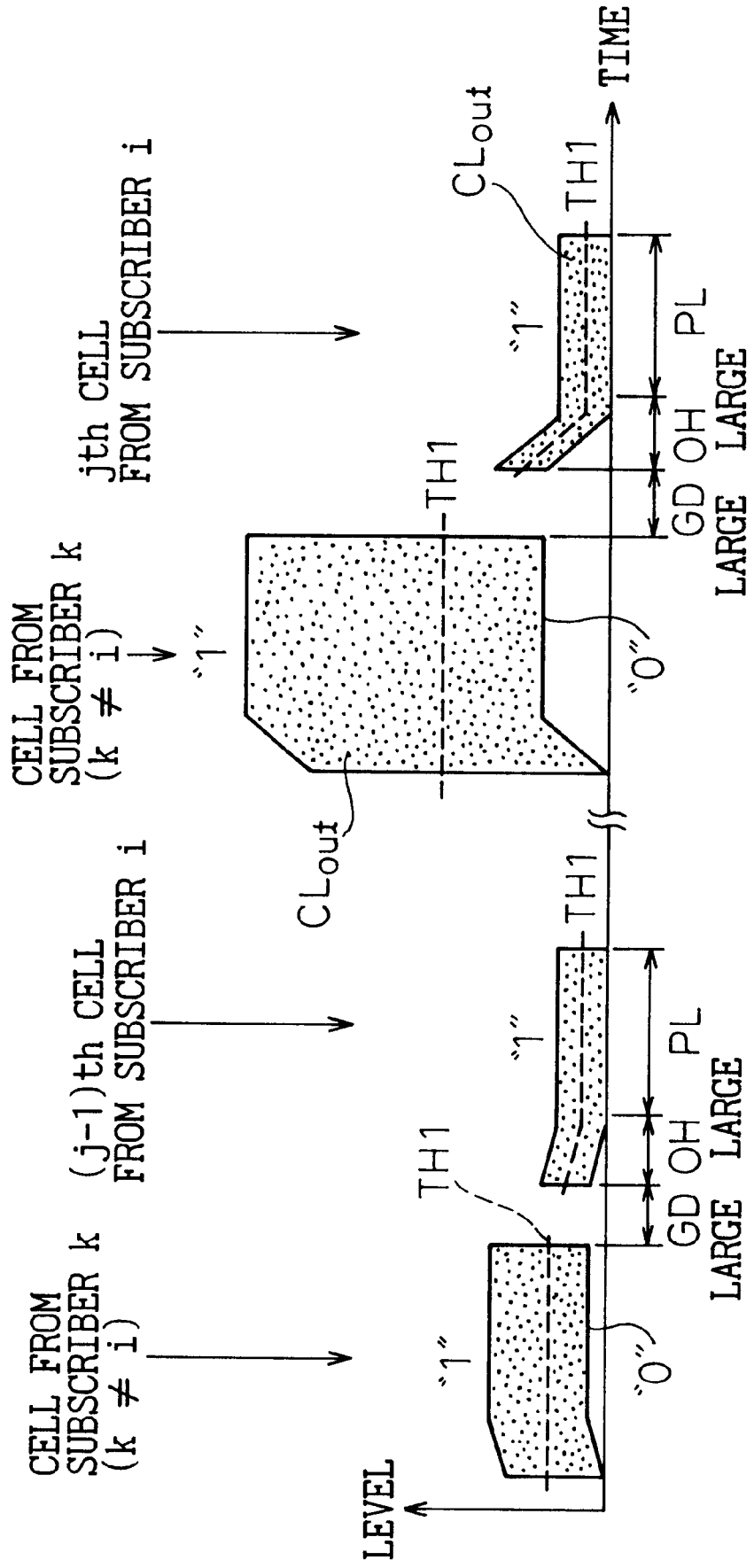
FIG. 15 is a view of the threshold value used in an optical burst receiving apparatus operated by the high speed ATC/AGC method.

FIG. 15 is a view of the threshold value used in an optical burst receiving apparatus operated by the high speed ATC/AGC method. Namely, the threshold value used in the optical burst receiving apparatus shown in FIG. 11 (second input II of the main amplifier circuit 18) varies as indicated by a dotted line TH1 of FIG. 15. Particularly, in the large dragging portion seen at the header of a cell immediately following a cell appearing with a large "1" level, like the two output signals CLout shown at the right side in FIG. 15, the threshold value TH1 faithfully follows the related change, so the intermediate value of the levels of the logics "1" and "0" (refer to TH of FIG. 12A) is secured. This is a major advantage.

There is, however, also a disadvantage. Referring to FIG. 15, the guard time GD is large and also the overhead region OH is large. This is extremely disadvantageous from the viewpoint of the transmission efficiency of the entire PON transmission system. The reason why the guard time GD becomes large and also the overhead region OH becomes large in this way is as follows.

In the circuit configuration of FIG. 11, whenever each cell signal CL is received, the "1" level detection circuit 15 and the "0" level detection circuit 16 for detecting the levels of the logics "1" and "0" of the electrical output signal CLout must be reset to an initial state before the reception of the light. That is, the capacitors C1 and C0 inside these circuits 15 and 16 must be reset (refer to "RESET" of FIG. 12A). This reset must be fully completed in the space of the guard time GD before actually receiving the cell signal CL. As a result, the guard time GD becomes large.

Further, the "1" and "0" level detection circuits 15 and 16 charge the capacitors C1 and C0 from the first at the time of every reset, therefore a long length of the preamble (alternating bits of logics "1" and "0") must be provided for this charging. This preamble is contained in the header portion of each output signal CLout. As a result, the overhead region OH becomes large.

FIG. 16 is a view of the threshold value used in an optical burst receiving apparatus operated by the system ATC/AGC method. Namely, the threshold value used in the optical burst receiving apparatus shown in FIG. 13 (second input II of the main amplifier circuit 18) varies as indicated by a dotted line TH2 in FIG. 16.

As apparent from FIG. 16, under the system ATC/AGC method, the guard time GD is small and the overhead region OH is small. Accordingly, the transmission efficiency of the entire PON transmission system is extremely good. This is a major advantage which is not obtained with the high speed ATC/AGC method.

The reason that both of the guard time GD and the overhead region OH can be made small in this way is that both of the reset operation in the guard time GD and the charging operation in the overhead region OH become unnecessary unlike the case according to the high speed ATC/AGC method. This is because, under the system ATC/AGC method, when viewing the subscriber i, as the threshold value to be used for the discrimination of the currently received (j-th) output signal CLout relating to the subscriber i, the stored threshold value obtained based on the immediately preceding((j-1)th) output signal CLout relating to this subscriber i is used. Here, attention was paid to the fact that while the levels of threshold values used by different subscribers were different, when viewing only individual subscriber i, there was almost no change in levels between the (j-1)th cell signal CL and the j-th cell signal CL.

As already explained, however, there is also a disadvantage in this system ATC/AGC method. This is the occurrence of a portion of the signal wherein discrimination of the logic by the threshold value (TH2) becomes difficult due to the low frequency response. This causes the problem of failed reception. Further, even if reception does not fail, there is the problem of deterioration of the bit error rate (BER).

Accordingly, the present invention provides an apparatus and method for reception of an optical burst making maintenance of high transmission efficiency possible without causing a failure of reception due to a low frequency response or a deterioration of the bit error rate. These will be explained in detail below.

Figure 1:
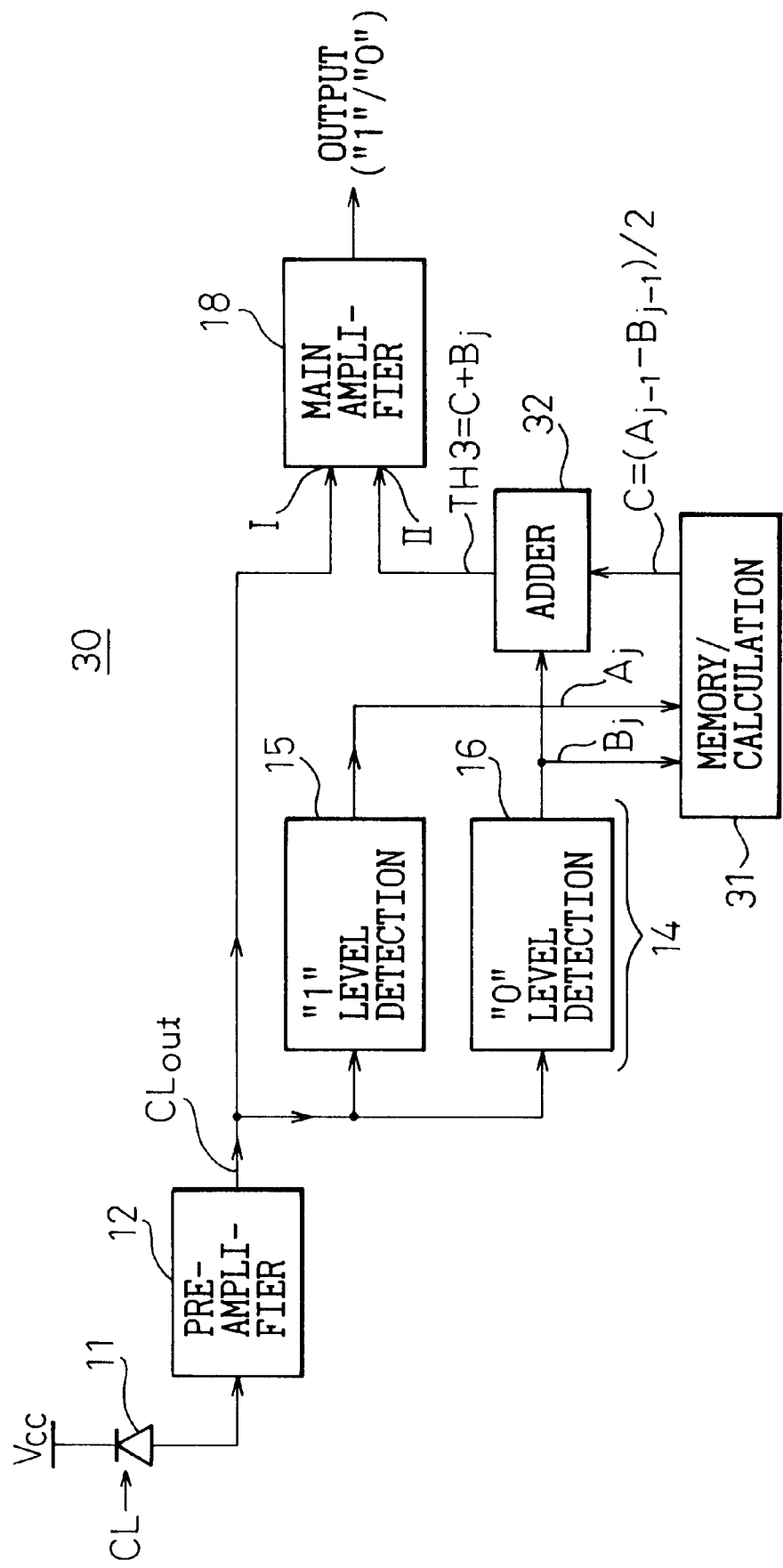
FIG. 1 is a block diagram showing the principle of an optical burst receiving apparatus according to the present invention.

FIG. 1 is a block diagram illustrating the principle of the optical burst receiving apparatus according to the present invention. The optical burst receiving apparatus 30 of the present invention, in the same way as the optical burst receiving apparatus 20 of the system ATC/AGC method shown in FIG. 13, has a light receiving element 11, a pre-amplifier circuit 12, a threshold control circuit 14 comprising a "1" level detection circuit 15 and a "0" level detection circuit 16, and a main amplifier circuit 18. At the same time, it contains a memory/calculation circuit 31 different from the memory/calculation circuit (21) and a new adder circuit 32.

Namely, the optical burst receiving apparatus 30 according to the present invention is provided with (i) a pre-amplifier circuit 12 for amplifying the output from the light receiving element 11 receiving the cell signal CL sent from each subscriber i;

(ii) a main amplifier circuit 18 receiving as its differential inputs the output signal CLout from the pre-amplifier circuit 12 and the threshold value TH3 (FIG. 2), discriminating the logics "1" and "0" of the output signal CLout by using this threshold value TH3 as a reference voltage, and further amplifying this and outputting the same;

(iii) a threshold control circuit 14 having a "1" level detection circuit 15 and a "0" level detection circuit 16 respectively detecting the level of the logic "1" and the level of the logic "0" of the output signal CLout; and (iv) a memory/calculation circuit 31 for updating values concerning the level of the detected logic "1" and the level of the detected logic "0" whenever a cell signal CL sent from each subscriber i is received and storing the values in the memory area assigned to the subscriber.

It is constituted so that the memory/calculation circuit 31 receives as its inputs a level $A_j$ of the logic "1" and a level $B_j$ of the logic "0" from the threshold control circuit 14, obtains a value C $(=(A_{j-1}-B_{j-1})/2)$ of almost a half of the difference of these levels by calculation, and outputs the same as the level value.

The threshold control circuit 14 further contains an adder circuit 32 for adding the level of the logic "0" detected by the "0" level detection circuit 16 and the level value stored in the memory area for the currently received output signal CLout (j). The added value (TH3) from this adder circuit 32 is applied to the second input II of the main amplifier circuit 18 as the threshold value TH3.

Figure 2:
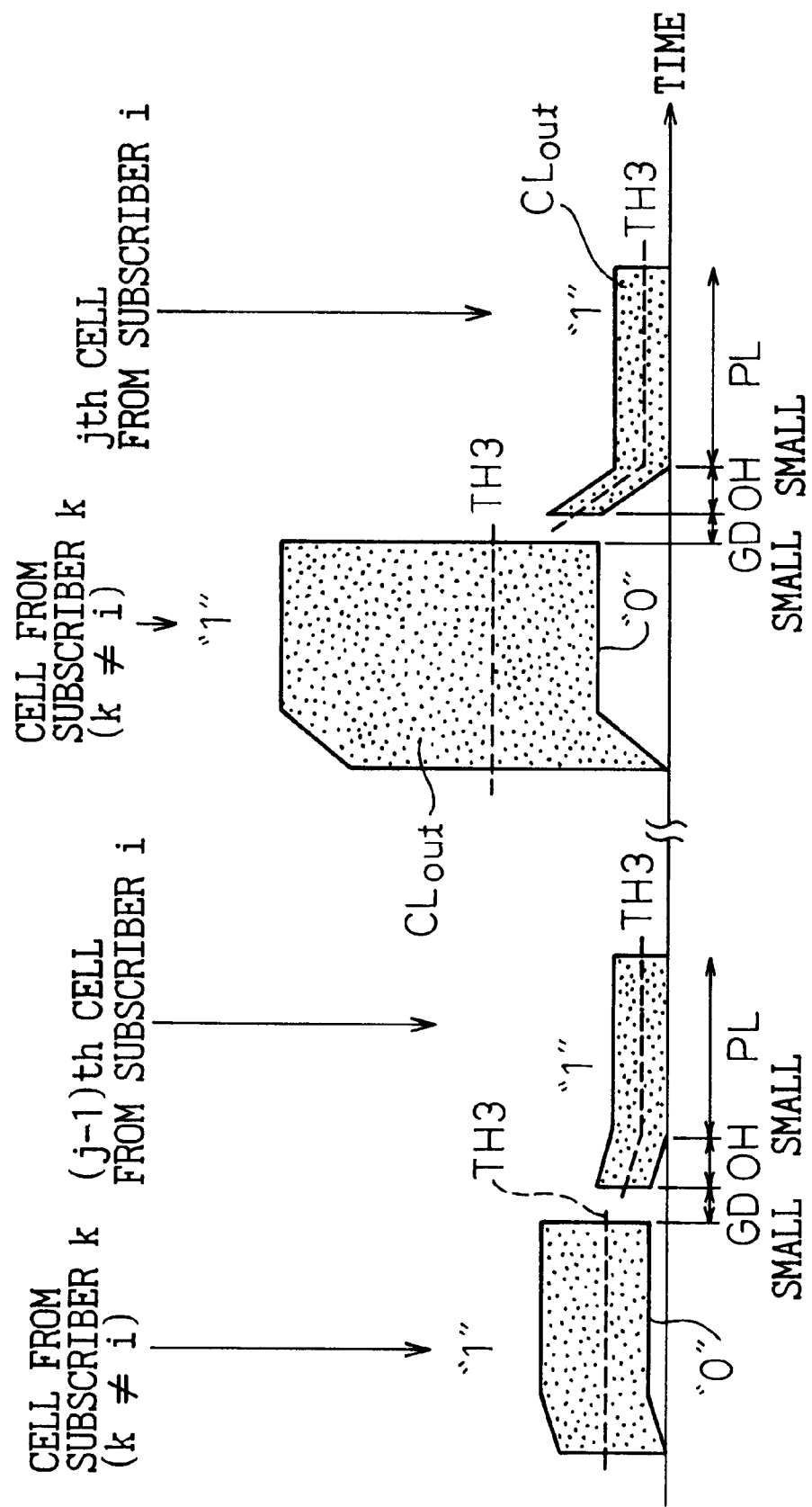
FIG. 2 is a view of a threshold value used in the optical burst receiving apparatus according to the present invention.

FIG. 2 is a view of the threshold value used in the optical burst receiving apparatus according to the present invention. This threshold value is TH3. According to the configuration of the present invention, the problem of reception failure indicated by a mark ○ (circle) in FIG. 16 in the case of the system ATC/AGC method of the related art is solved. This is because, even in the header portion in the output signal CLout from the subscriber i, the threshold value TH3 has become substantially an intermediate value of the levels of the logics "1" and "0".

In addition, as shown in FIG. 2, both of the guard time GD and overhead region OH are small, so the advantage derived from the system ATC/AGC method of the related art explained referring to FIG. 16 is maintained as it is.

The principle of generation of the threshold value TH3 according to the present invention is completely different from the principle of generation of the threshold value TH2 of the related art shown in FIG. 16. That is, it is as follows.

The threshold value TH2 of the related art is found by c=(a+b)/2 as shown by the c shown in FIG. 13. That is, a value (a+b) of addition of the level (a) of the logic "1" and the level (b) of the logic "0" for the (j−1)th cell signal CL is found, this is halved, and the result is defined as the threshold value TH2 (=(a+b)/2) for the current j-th cell signal CL.

Contrary to this, to find the threshold value TH3 of the present invention, a level difference $(A_{j-1}-B_{j-1})$ between the level $(A_{j-1})$ of the logic "1" and the level $(B_{j-1})$ of the logic "0" for the (j−1)th cell signal CL, that is, the amplitude, is found, this is halved, and the value C of a half of the amplitude, i.e., $(A_{j-1}-B_{j-1})/2$, is found. Then, for the output signal $B_j$ for the currently received j-th cell signal, the value C of the half of the difference, i.e., $(A_{j-1}-B_{j-1})/2$, is imposed at the adder circuit 32 to obtain the threshold value TH3 (=C+$B_j$). By this, the $B_j$ of the dragging portion is reflected on the threshold value TH3 as it is at the header portion of the output signal CLout, so the threshold value TH3 can follow the related change even at the header portion.

Figure 3:
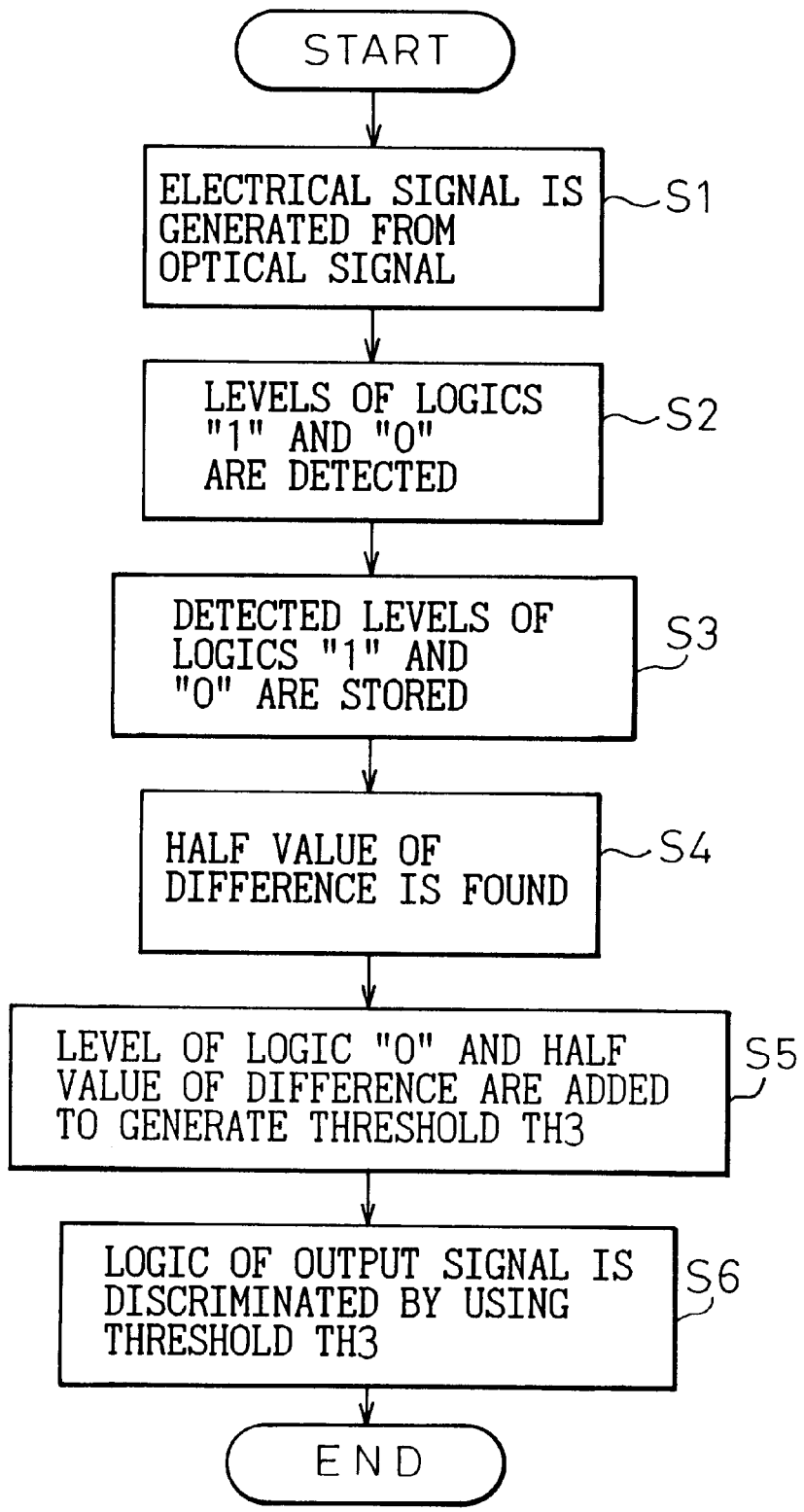
FIG. 3 is a flowchart illustrating the method of receiving an optical burst according to the present invention.

FIG. 3 is a flowchart for illustrating the method of receiving an optical burst according to the present invention. The operation of the optical burst receiving apparatus can be understood also as the method represented in the figure.

The method of receiving an optical burst according to the present invention comprises the following steps:

Step S1: Receive the cell signal CL of the light at the light receiving element 11 and generate the electrical output signal CLout.

Step S2: Detect the level of the logic "1" and the level of the logic "0" of the output signal CLout (threshold control circuit 14).

Step S3: Store the level $A_{j-1}$ of the detected logic "1" and the level $B_{j-1}$ of the logic "0" (memory area of the memory/calculation circuit 31).

Step S4: Find the value C of a half of the difference between the level $A_{j-1}$ of the stored logic "1" and the level $B_{j-1}$ of the logic "0" (calculation at the memory/calculation circuit 31).

Step S5: Add the level $B_j$ of the logic "0" detected for the currently received output signal CLout and the value C of half of the difference to generate the threshold value TH3 (adder circuit 32).

Step S6: Discriminate the logics "1" and "0" of the currently received output signal CLout by using the threshold value TH3.

Figure 4:
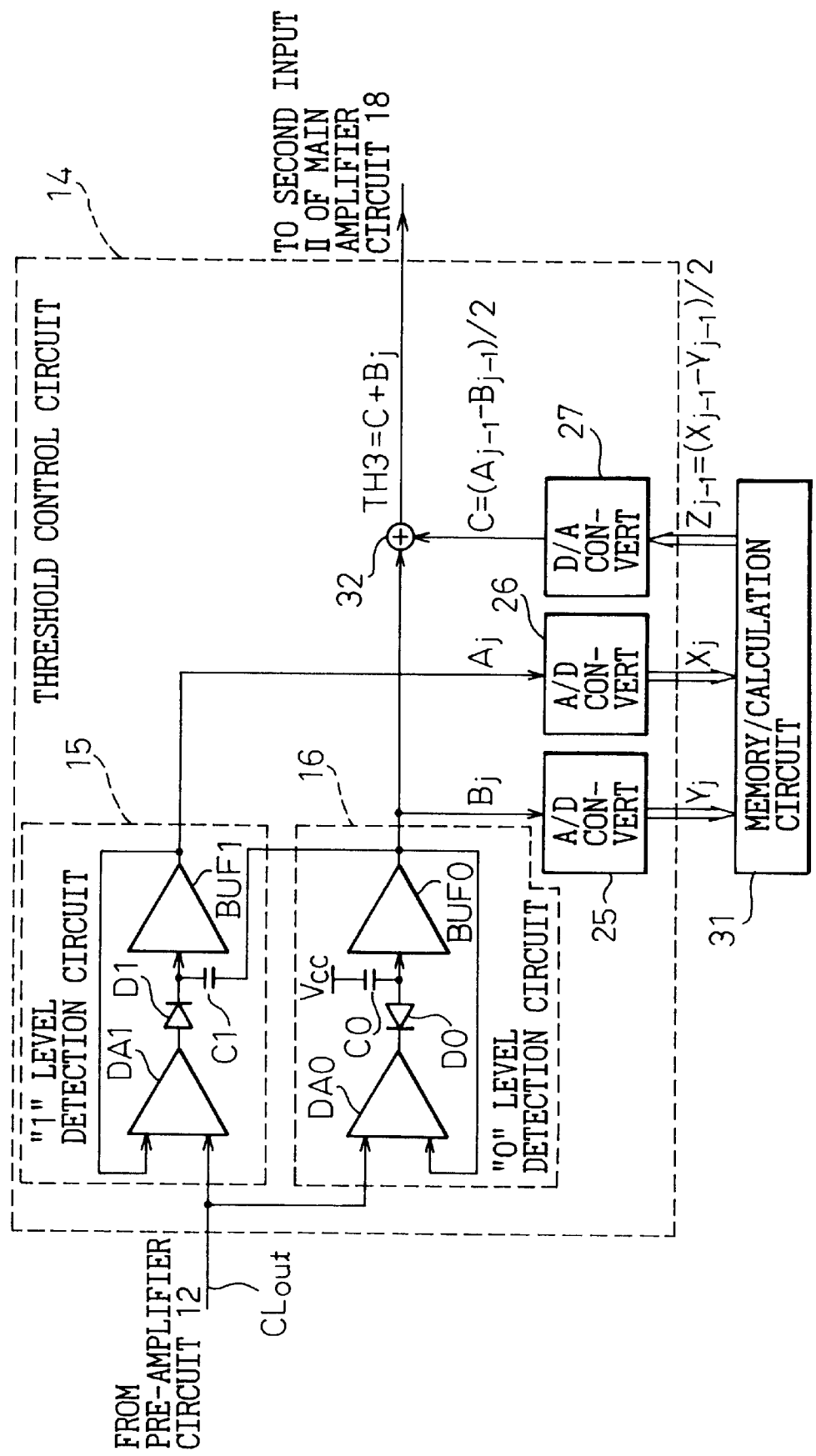
FIG. 4 is a view concretely representing a principal part of the present invention.

FIG. 4 is a view illustrating in more detail the principal parts of the present invention. That is, it shows the part of the threshold control circuit 14 comprising the "1" level detection circuit 15 and the "0" level detection circuit 16, the memory/calculation circuit 31, and the adder circuit 32 in the configuration of FIG. 1. FIG. 4, as an actual example, shows the A/D converters 25 and 26 and a D/A converter 27.

The level $A_j$ (analog) of the detected logic "1" and the level $B_j$ (analog) of the logic "0" are respectively converted to the digital values $X_j$ and $Y_j$ via the A/D converters 25 and 26 and stored in the corresponding memory areas in the memory/calculation circuit 31.

When the cell signal CL is newly received and the j-th output signal CLout corresponding to this is input to the threshold control circuit 14, the memory/calculation circuit 31 reads the digital values $X_{j-1}$ and $Y_{j-1}$ for the output signal CLout (j−1) corresponding to the immediately preceding (j−1)th cell signal input from the same subscriber and further calculates the intermediate value (digital) $Z_{j-1}$ thereof to obtain $Z_{j-1}=(X_{j-1}-Y_{j-1})/2$.

The intermediate value $Z_{j-1}$ is converted to an analog value C by the D/A converter 27. Here, C equals $(A_{j-1}-B_{j-1})/2$. Further, in the adder circuit 32, the threshold value TH3 is obtained by adding the level $B_j$ of the logic "0" of CLout detected by the currently received output signal CLout and the above C. Here, TH3 equals $C+B_j$.

Figure 5:
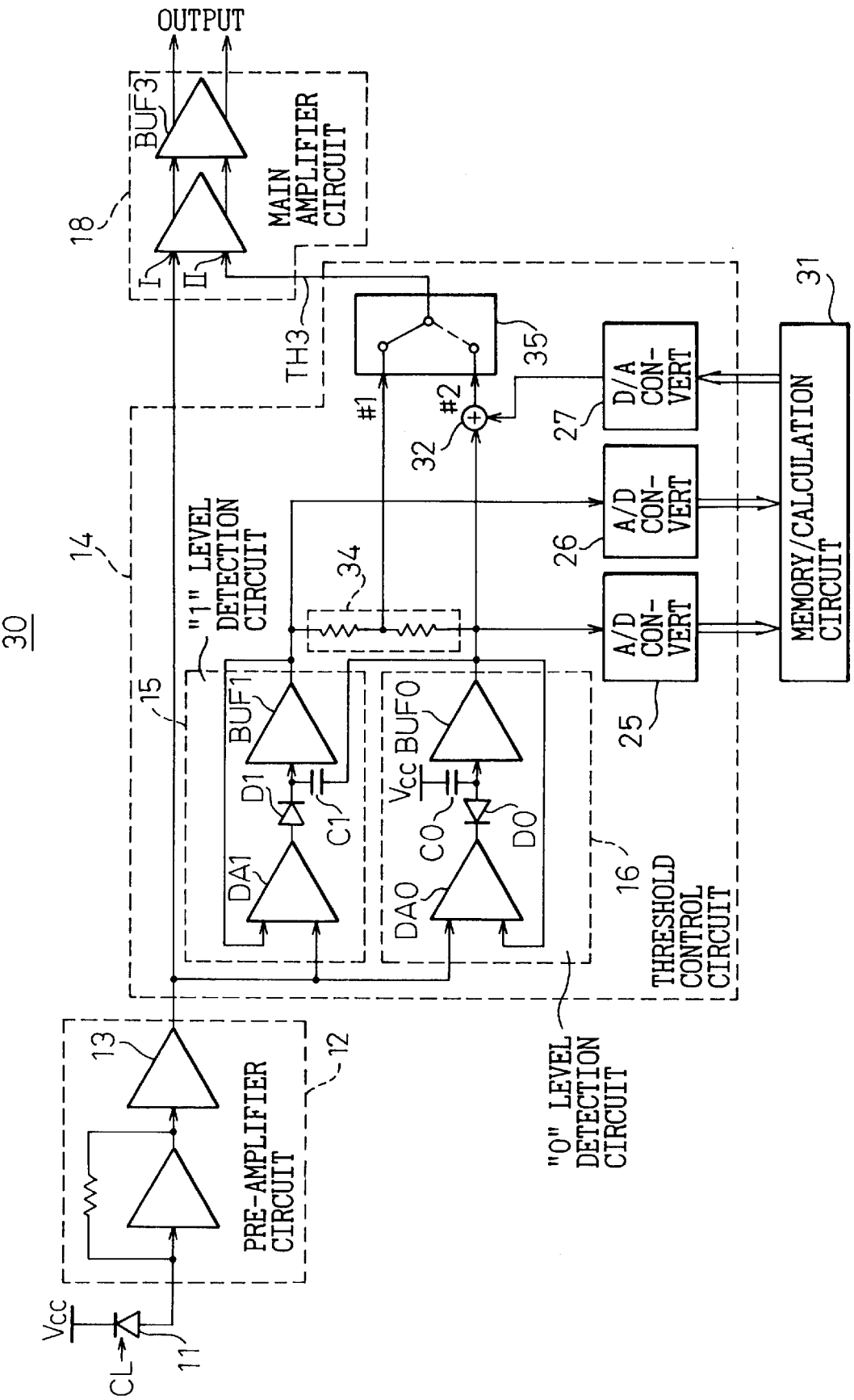
FIG. 5 is a view of a first embodiment of the optical burst receiving apparatus according to the present invention.

FIG. 5 is a view of a first embodiment of the optical burst receiving apparatus according to the present invention. This is characterized in that a voltage dividing circuit 34 and a first switch circuit 35 are provided. Namely, the threshold control circuit 14 further contains a voltage dividing circuit 34 for outputting a voltage of substantially half of the sum of the output voltages from the "1" level detection circuit 15 and the "0" level detection circuit 16 and a first switch circuit 35 for selecting the output voltage from this voltage dividing circuit 34 or the added value from the adder circuit 32 and outputting the same to the main amplifier circuit 18.

The first switch circuit 35 selects the output voltage from this voltage dividing circuit 34 and outputs this at an initial state where the level value has not been stored in the memory area.

In a PON transmission system, the operation of the initial start-up of the system is important. The office side equipment 1 must prepare sequence control information indicating which subscriber must transmit its signal by what time slot for each of a plurality of subscribers. The most important information when preparing this sequence control information is the delay time for every subscriber. This delay time is obtained by measuring a round trip time until a cell signal sent from the office reaches each subscriber and returns again.

When performing this measurement, that is, at the initial state of the system, no level value is stored in the memory area for each subscriber in the memory/calculation circuit 31. Accordingly, of course, the threshold value TH3 also cannot be generated. Therefore, the threshold control circuit 14 cannot operate at all. For this reason, it is also not possible to measure the round trip time.

Therefore, at the above initial state of the system where no data is set in the memory areas, generation of the threshold value TH3 without the memory/calculation circuit 31 becomes necessary. This is done by the voltage dividing circuit 34.

The voltage dividing circuit 34 receives the detection level ("1") of the "1" level detection circuit 15 and the detection level ("0") of the "0" level detection circuit 16 at the two ends of two series-connected resistors and outputs a voltage corresponding to the intermediate value of the two from its intermediate connection point. This intermediate value becomes the threshold value TH3.

The first switch circuit 35 selects either of the output from the voltage dividing circuit 34 or the output from the adder circuit 32 in accordance with whether the system is in its initial start-up (#1) or is in its usual operation (#2) and supplies this as the threshold value TH3 to the second input II of the main amplifier circuit 18. Note that the signal by which the first switch circuit 35 selects the #1 side or the #2 side can be given by the sequence control information.

Where it is desired to realize the configuration explained above, generally, it can be considered to provide "1" and "0" level detection circuits for the #1 side and also provide "1" and "0" level detection circuits for the #2 side. In the configuration of FIG. 5, however, a structure wherein the "1" and "0" level detection circuits of the #1 side are commonly used as the "1" and "0" level detection circuits of the #2 side is adopted. Here, attention was paid to the fact that high speed operation is not required at the initial start-up of a system in comparison with the time of usual operation.

As a result, in comparison with the case where "1" and "0" level detection circuits of a first division and a second division are provided respectively independently on the #1 side and the #2 side, there are <1> the advantage that there is no relative circuit error between divisions and <2> the advantage that since the two divisions are realized by a single division, the size of the circuit can be reduced and it becomes possible to achieve a reduction of cost and a reduction of power consumption.

The above explanation was made of the ATC part as the main constituent part of the threshold control circuit 14. However, the threshold control circuit 14 practically includes the AGC part as well. The second embodiment of the present invention explained below proposes the concrete configuration of the AGC part.

Figure 6:
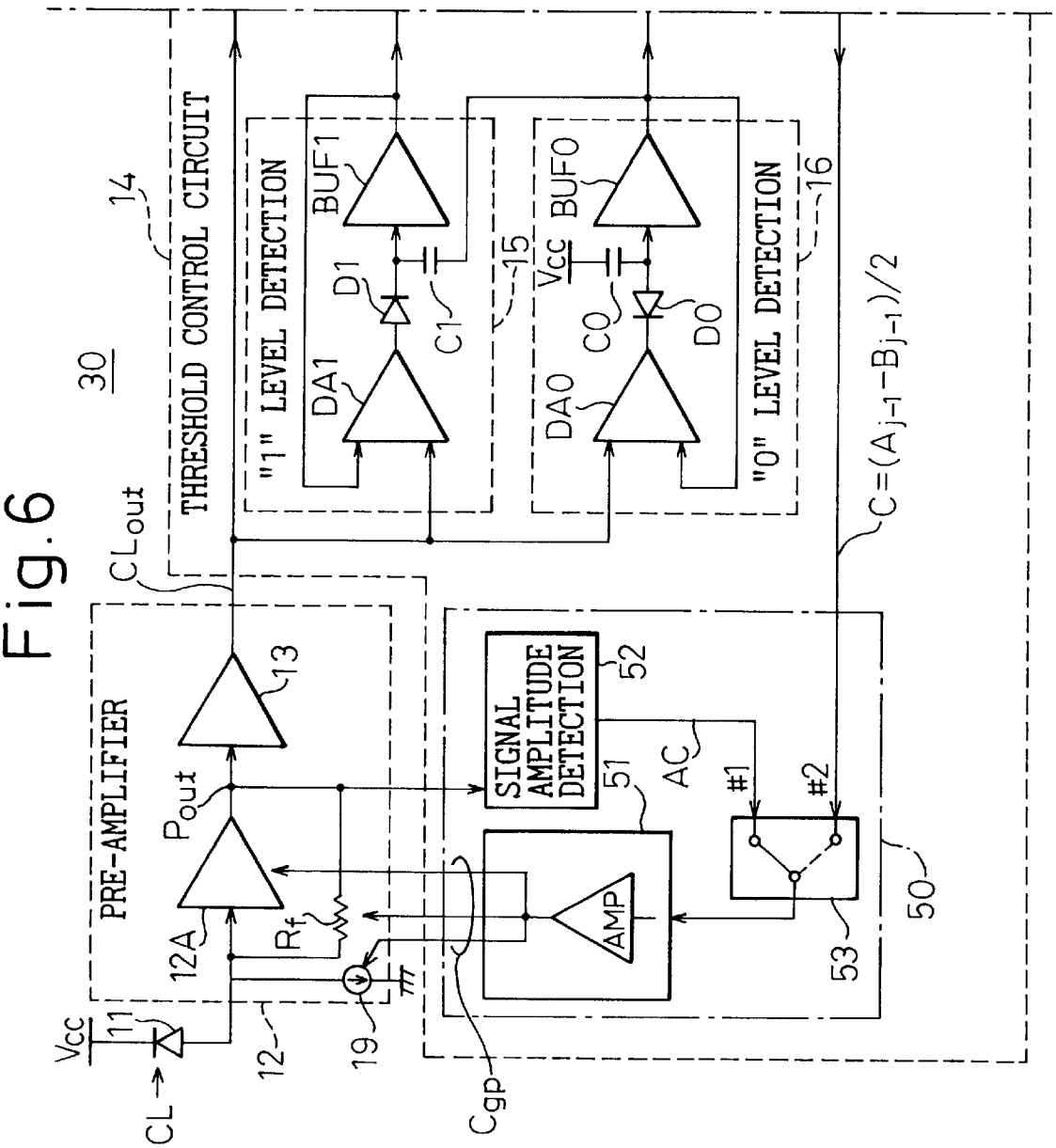
FIG. 6 is a first view of a second embodiment of the optical burst receiving apparatus according to the present invention.
Figure 7:
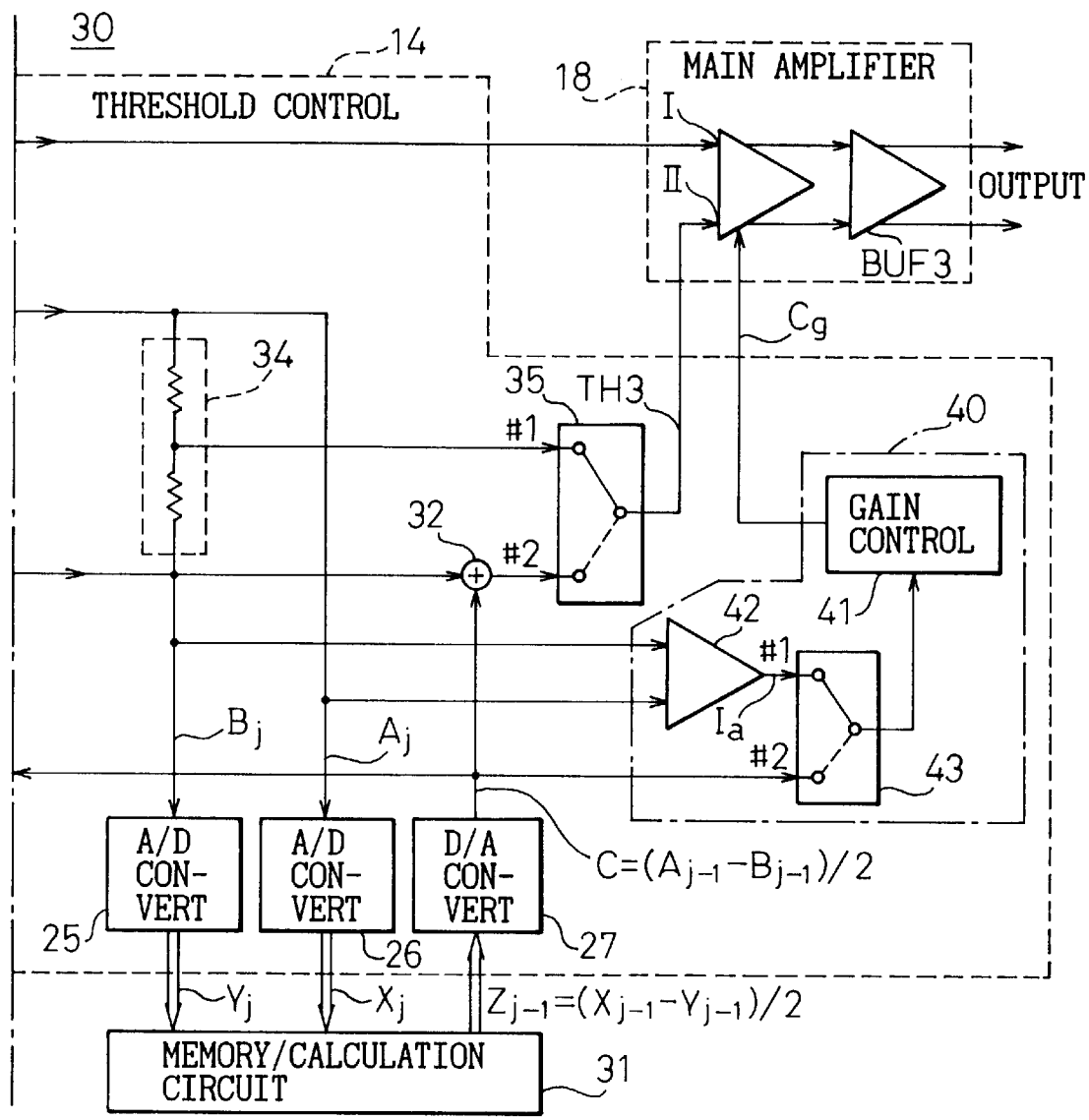
FIG. 7 is a second view of the second embodiment of the optical burst receiving apparatus according to the present invention.

FIG. 6 and FIG. 7 are views of the second embodiment of the optical burst receiving apparatus according to the present invention.

Referring to FIG. 7, the threshold control circuit 14 is provided with a main amplification gain control unit 40 for controlling the amplification gain of the main amplifier circuit 18. This main amplification gain control unit 40 contains an amplification gain control circuit 41 which outputs a control signal $C_g$ for controlling the amplification gain of the main amplifier circuit 18. The amplification gain control circuit 41 is controlled in accordance with the level value C stored in the memory/calculation circuit 31.

The control of the amplification gain (AGC) is carried out based upon the amplitude of the output signal CLout supplied to the first input I of the main amplifier circuit 18. Usually, the amplitude of the output signal CLout input is detected every instant in real time and fed back to the main amplifier circuit 18. With this method, the operation from the detection of the amplitude to the feedfoward must be carried out at an extremely high speed, so this is disadvantageous.

However, taking note of the term $(X_{j-1}-Y_{j-1})$ in the output $Z_{j-1}$ from the memory/calculation circuit 31, this term truly shows the amplitude value (digital) of the output signal CLout. If the amplitude value obtained for the immediately preceding cell of the same subscriber is utilized, the AGC can be executed at a low speed.

More specifically, the analog amplitude value $(A_{j-1}-B_{j-1})$ obtained via the D/A converter 27 is given as the amplitude information to the amplification gain control circuit 41. Then, the intended control signal $C_g$ is obtained.

However, at the initial state of the system (time of initial start-up), no level value has been stored in the memory areas for respective subscribers in the memory/calculation circuit 31. Accordingly, of course, the analog amplitude value $(A_{j-1}-B_{j-1})$ also cannot be generated. Therefore, the main amplification gain control unit 40 cannot operate at all.

Therefore, at the initial state of the system where no level value has been set in the memory areas, it becomes necessary to detect the amplitude of the output signal CLout without using the memory/calculation circuit 31.

For this reason, the main amplification gain control unit 40 further contains an amplitude detection circuit 42 for receiving as its inputs the level of the logic "1" and the level of the logic "0" detected at the threshold control circuit 14 and outputting the amplitude information Ia by the difference of these levels and contains a second switch circuit 43 for selecting the amplitude information Ia or the level value C stored in the memory/calculation circuit 31 and outputting the same to the amplification gain control circuit 41. This second switch circuit 43 selects the amplitude information Ia from the amplitude detection circuit 42 at the initial state where no level value C has been stored in the memory areas 31 and outputs the same.

Whether the second switch circuit 43 selects the #1 side at the initial state of the system or the #2 side at the time of usual operation can be determined by the sequence control information.

The amplitude detection circuit 42 commonly uses the "1" level detection circuit 15 and the "0" level detection circuit 16 (FIG. 6) in the threshold control circuit 14 as shown in the figure. That is, the "1" level detection circuit and the "0" level detection circuit are not separately provided independently for the amplitude detection circuit 42. By this, in comparison with the latter case (where they are separately independently provided), the former case (common use) has <1> the advantage that there is no relative circuit error and <2> the advantage that since the circuit is realized by a single division (15, 16), the size of the circuit can be reduced, the cost reduced, and the power consumption reduced.

Referring to FIG. 6, the threshold control circuit 14 is provided with a pre-amplification characteristic control unit 50 for controlling the amplification characteristics of the pre-amplifier circuit 12. This pre-amplification characteristic control unit 50 contains a pre-amplification characteristic control circuit 51 which outputs a pre-amplification control signal $C_{gp}$ for controlling the amplification characteristics of the pre-amplifier circuit 12. This pre-amplification characteristics control circuit 51 is controlled in accordance with the level value C stored in the memory/calculation circuit 31.

The control of the pre-amplification characteristics (AGC) is carried out based upon the amplitude of the output signal Pout from the pre-amplifier circuit 12. Usually, the amplitude of the output signal Pout from the circuit 12 is detected at every instant in real time and fed back to the pre-amplifier 12A. With this method, the operation from the detection of amplitude to the feedback must be carried out at an extremely high speed, which is a disadvantage.

However, taking note of the term $(X_{j-1}-Y_{j-1})$ in the output $Z_{j-1}$ from the memory/calculation circuit 31, this term truly shows the amplitude value (digital) of the output signal CLout correlated with the output signal Pout. If the amplitude value obtained for the immediately preceding cell of the same subscriber is utilized, the control of the pre-amplification characteristics (AGC) can be carried out at a low speed.

More specifically, the analog amplitude value $(A_{j-1}-B_{j-1})$ obtained via the D/A converter 27 is given as the amplitude information to the pre-amplification characteristic control circuit 51. Then, the intended pre-amplification control signal $C_{gp}$ is obtained.

However, at the initial state of the system (time of initial start-up), no level value is stored in the memory areas for respective subscribers in the memory/calculation circuit 31. Accordingly, naturally, the analog amplitude value $(A_{j-1}-B_{j-1})$ also cannot be generated, therefore the pre-amplification characteristic control unit 50 cannot operate at all.

Therefore, at the initial state of the system where no level value has been set in the memory areas, it becomes necessary to detect the amplitude of the output signal Pout without the memory/calculation circuit 31.

For this reason, the pre-amplification characteristic control unit 50 further contains a signal amplitude detection circuit 52 which outputs an automatic gain control signal AC for performing the automatic gain control of the pre-amplification circuit and contains a third switch circuit 53 for selecting the automatic gain control signal or the level value C stored in the memory/calculation circuit 31 and outputting the same to the pre-amplification characteristic control circuit 51. The third switch circuit 53 selects the automatic gain control signal from the signal amplitude detection circuit 52 at the initial state where no level value has been stored in the memory areas and outputs the same.

Whether the third switch circuit 53 selects the #1 side at the initial state of the system or the #2 side at the time of a usual operation can be determined the already explained sequence control information.

Looking at the pre-amplification characteristic control circuit 51, this controls at least one of an open loop gain of the pre-amplifier circuit (amplifier 12A), a feedback resistor $R_f$ constituting this pre-amplifier circuit (amplifier 12A), and a by-pass current flowing through a by-pass current source 19 added to the input stage of the pre-amplifier circuit 12.

In FIG. 6, an example of simultaneously controlling all of these open loop gain, feedback resistor $R_f$, and the by-pass current is shown. The feedback resistor $R_f$ is a transimpedance type feedback resistor and can be constituted by a field effect transistor (FET). The signal $C_{gp}$ is applied to the gate of this FET. Further, the by-pass current source 19 feeding the by-pass current can also be constituted by a FET, and the signal $C_{gp}$ applied to the gate of this FET.

Note that, FIG. 6 is drawn so that the same pre-amplification control signal $C_{gp}$ is applied to all of the amplifier 12A, the feedback resistor $R_f$, and the by-pass current source 19, but this is for convenience in illustration. In actuality, these three types of signals $C_{gp}$ are different from each other in phase or level. An adjusting means (not illustrated) for this purpose can be respectively built in the by-pass current source 19, the feedback resistor $R_f$, and the amplifier 12A concerned.

Above, a detailed explanation was made of the threshold control circuit 14 and the memory/calculation circuit 31 according to the present invention. Next, a few structural examples will be shown regarding the overall configuration of the optical burst receiving apparatus 30.

Figure 8:
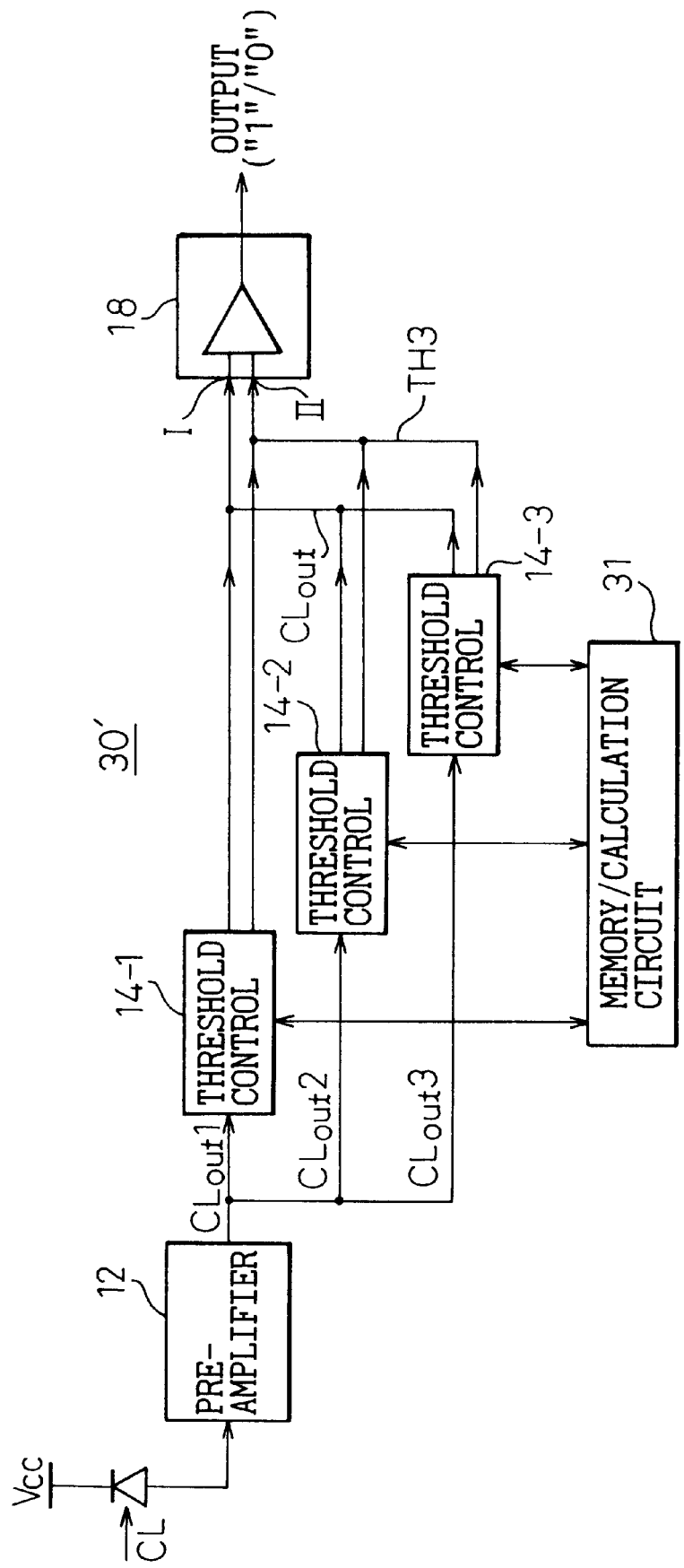
FIG. 8 is a view schematically showing a group-configuration optical burst receiving apparatus.

FIG. 8 is a view schematically showing a group-configuration optical burst receiving apparatus. In the figure, a triplex-configuration optical burst receiving apparatus 30' comprising the threshold control circuits 14-1, 14-2, and 14-3 is shown as an example. The apparatus 30' is provided with at least two threshold control circuits (14-1, 14-2, and 14-3) having the same configurations as that of the threshold control circuit 14. These threshold control circuits are commonly connected to the pre-amplifier circuit 12, the memory/calculation circuit 31, and the main amplifier circuit 18. The plurality of cell signals CL to be continuously input are allocated to and processed by these threshold control circuits 14-1, 14-2, and 14-3 in order.

When assuming now that the cell signals CL which are input are as CL1, CL2, CL3, CL4, . . . , the threshold control circuit 14-1 handles the processing of the output signals CLout1, particularly the cell signals CL1, CL4, CL7, CL10, . . . , the threshold control circuit 14-2 handles the processing of the output signals CLout2, particularly the cell signals CL2, CL5, CL8, CL11, . . . , and the threshold control circuit 14-3 handles the processing of the output signals CLout3, particularly the cell signals CL3, CL6, CL9, CL12, . . . .

By doing this, the memory/calculation circuit 31 need only execute the four series of processing which should be carried out when one cell signal is input to the optical burst receiving apparatus 30', that is, <1> a first processing for detecting the level of the logic "1" and the level of the logic "0" of the output signal CLout, <2> a second processing for storing the level of the detected logic "1" and the level of the detected logic "0", <3> a third processing for finding the intermediate value of the level of the stored logic "1" and the level of the stored logic "0", and <4> a fourth processing for adding the level of logic "0" detected for the currently received output signal CLout and the intermediate value to generate the threshold value TH3, at a speed of about ⅓ the speed of the case where this is done by a single threshold control circuit 14. This leads to a reduction of the costs as well.

If a duplex configuration (14-1 and 14-2) is adopted, one threshold control circuit 14-1 may handle the odd numbered cell signals and the other threshold control circuit 14-2 may handle the even numbered cell signals.

Which threshold control circuit (14-1, 14-2, or 14-3) is to be made active each time a cell signal is input can be determined by the already explained sequence control information.

Figure 9:
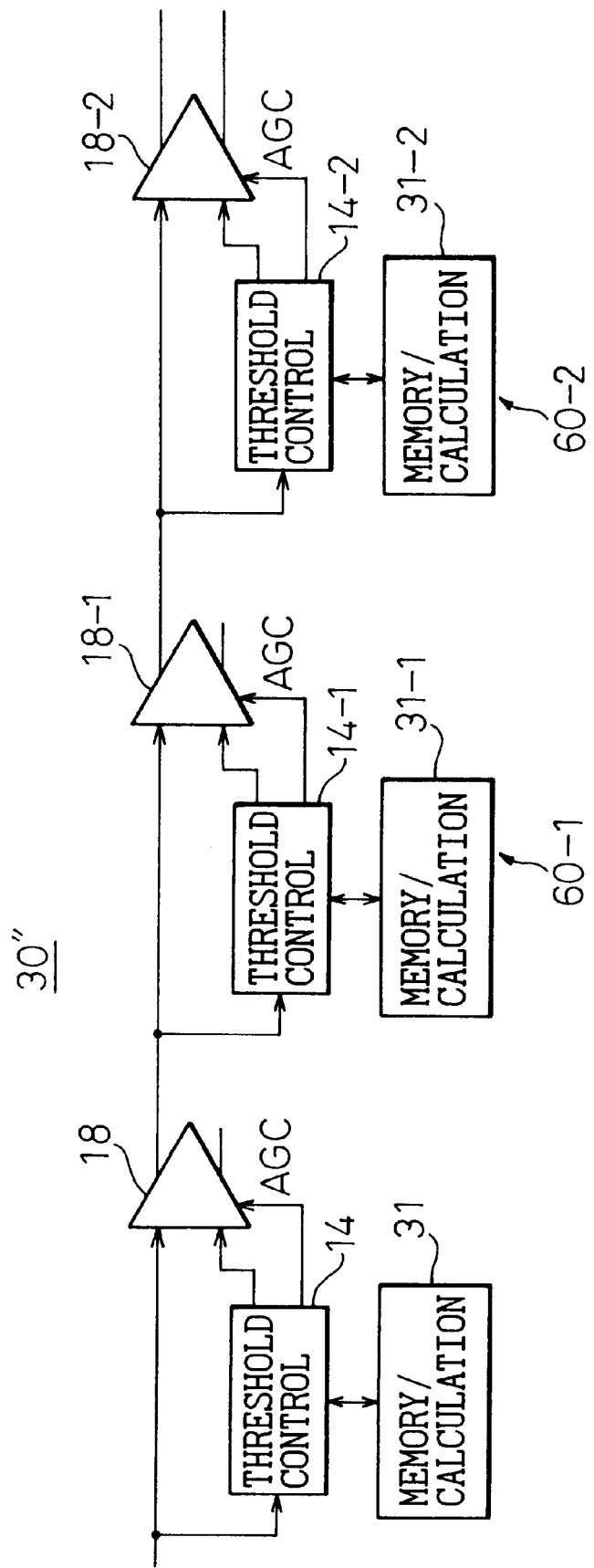
FIG. 9 is a view schematically showing a multistage-configuration optical burst receiving apparatus.

FIG. 9 is a view schematically showing a multistage configuration optical burst receiving apparatus. In the figure, as an example, a three-stage configuration optical burst receiving apparatus 30" comprising the threshold control circuits 14, 14-1, and 14-2 and the memory/calculation circuits 31, 31-1, and 31-2 respectively accompanying the same is shown.

This optical burst receiving apparatus 30" is constituted by connecting in cascade at least one threshold control/main amplification stage (60) comprising the threshold control circuits 14-1 and 14-2 having the same configurations as that of the threshold control circuit 14 and the main amplifier circuits 18-1 and 18-2 having the same configurations as that of the main amplifier circuit 18 to the output side of the main amplifier circuit 18 together with the memory/calculation circuits (31-1, 31-2) respectively accompanying the same.

It has been known that the input of the amplifier circuit of the main signal system, that is, the main amplifier circuit, potentially includes a so-called "offset voltage". When this offset voltage is potentially included, the pulse width of the output thereof varies. When sampling of the signal is carried out in a latter retiming circuit (not illustrated), it becomes difficult to correctly sample the center thereof.

It is to cancel out such an offset voltage, which becomes a cause of fluctuation of the pulse width, that the above multistage cascade connection configuration is adopted by the optical burst receiving apparatus 30" of the present figure.

As explained above, according to the present invention, in the optical burst receiving apparatus operated by the system ATC/AGC method, the problem of reception failure shown in FIG. 16 due to the low frequency response can be efficiently solved by addition of extremely simple hardware and modification of the method of calculation in the memory/calculation circuit.

While the invention has been described with reference to specific embodiments chosen for purposes of illustration, it should be apparent that numerous modifications could be made thereto by those skilled in the art without departing from the basic concept and scope of the invention.

What is claimed is:

1. An optical burst receiving apparatus provided with:
   a pre-amplifier circuit for amplifying an output from a light receiving element receiving cell signals sent from subscribers;
   a main amplifier circuit receiving as its differential inputs the output signal from said pre-amplifier circuit and a threshold value, discriminating logics "1" and "0" of the output signal by using the threshold value as a reference voltage, and further amplifying and outputting the same;
   a threshold control circuit having a "1" level detection circuit and a "0" level detection circuit respectively detecting a level of the logic "1" and a level of the logic "0" of said output signal; and
   a memory/calculation circuit for updating values concerning the level of the detected logic "1" and the level of the detected logic "0" whenever a cell signal sent from each said subscriber is received and storing the values in a memory area assigned to respective subscribers;
   said memory/calculation circuit receiving as its inputs a level of said logic "1" and a level of the logic "0" from said threshold control circuit, obtaining a value of substantially a half of the difference of these levels by calculation, and outputting the same as said level value;
   said threshold control circuit further containing an adder circuit for adding the level of the logic "0" detected by said "0" level detection circuit and said level value stored in said memory area for said output signal which is now being received; and
   an added value from the adder circuit being supplied to said main amplifier circuit as said threshold value.

2. An optical burst receiving apparatus according to claim 1, wherein:
   said threshold control circuit further contains a voltage dividing circuit for outputting a voltage of substantially a half of a sum of output voltages from said "1" level detection circuit and "0" level detection circuit and contains a first switch circuit for selecting the output voltage from the voltage dividing circuit or the added value from said adder circuit and outputting the same to said main amplifier circuit; and
   said first switch circuit selects the output voltage from said voltage dividing circuit and outputs this at an initial state where said level value has not been stored in said memory area.

3. An optical burst receiving apparatus according to claim 1, wherein
   a main amplification gain control unit is further provided for controlling the amplification gain of said main amplifier circuit;
   the main amplification gain control unit contains an amplification gain control circuit which outputs a control signal for controlling the amplification gain of the main amplifier circuit; and
   the amplification gain control circuit is controlled in accordance with said level value stored in said memory/calculation circuit.

4. An optical burst receiving apparatus according to claim 3, wherein:
   said main amplification gain control unit further contains an amplitude detection circuit for receiving as its inputs the level of said logic "1" and the level of logic "0" detected at said threshold control circuit and outputting an amplitude information based on the difference of these levels and contains a second switch circuit for selecting the amplitude information or said level value stored in said memory/calculation circuit and outputting the same to said amplification gain control circuit; and
   said second switch circuit selects said amplitude information from said amplitude detection circuit at the initial state where said level value has not been stored in said memory area and outputs the same.

5. An optical burst receiving apparatus according to claim 1, wherein:
   a pre-amplification characteristic control unit is further provided for controlling the amplification characteristics of said pre-amplifier circuit;
   the pre-amplification characteristic control unit contains a pre-amplification characteristic control circuit which outputs a pre-amplification control signal for controlling the amplification characteristics of said pre-amplifier circuit; and
   the pre-amplification characteristic control circuit is controlled in accordance with said level value stored in said memory/calculation circuit.

6. An optical burst receiving apparatus according to claim 5, wherein:
   said pre-amplification characteristic control unit further contains a signal amplitude detection circuit which outputs an automatic gain control signal for performing automatic gain control of said pre-amplification circuit per se and contains a third switch circuit for selecting the automatic gain control signal or said level value stored in said memory/calculation circuit and outputting the same to said pre-amplification characteristic control circuit; and
   said third switch circuit selects said automatic gain control signal from said signal amplitude detection circuit at an initial state where said level value has not been stored in said memory area and outputs the same.

7. An optical burst receiving apparatus according to claim 5, wherein said pre-amplification characteristic control circuit controls
   at least one of an open loop gain of said pre-amplifier circuit, a feedback resistor constituting the pre-amplifier circuit, and a by-pass current flowing through a by-pass current source added to the input stage of the pre-amplifier circuit.

8. An optical burst receiving apparatus according to claim 1, wherein further provision is made of at least two threshold control circuits having the same configuration as that of said threshold control circuit; these threshold control circuits are commonly connected to said pre-amplifier circuit, said memory/calculation circuit, and said main amplifier circuit; and a plurality of said cell signals to be continuously input are assigned to these threshold control circuits and processed in order.

9. An optical burst receiving apparatus according to claim 1, wherein at least one threshold control/main amplification stage comprising threshold control circuits having the same configurant as that of said threshold control circuit and main amplifier circuits having the same configuration as that of said main amplifier circuit is connected in cascade to the output side of said main amplifier circuit together with the memory/calculation circuits respectively accompanying the same.

10. An optical burst receiving method comprising:

a step of receiving optical cell signals at a light receiving element and generating electrical output signals;

a step of detecting a level of the logic "1" and a level of the logic "0" of said output signal;

a step of storing the detected level of said logic "1" and the detected level of the logic "0";

a step of finding a value of substantially a half of the difference of the level of said logic "1" and the level of the logic "0" which are stored; and a step of adding the level of the logic "0" detected for said currently received output signal and the value of substantially a half of said difference to generate a threshold value; and a step of discriminating the logics "1" and "0" of the currently received output signal using said threshold value.

* * * * *